United States Patent [19]

Michaut

[11] Patent Number: 5,660,705
[45] Date of Patent: Aug. 26, 1997

[54] METHOD OF REPAIRING A TUBE, SUCH AS A STEAM-GENERATOR TUBE, BY ELECTROPLATING LINING

[75] Inventor: Bernard Michaut, Lyons, France

[73] Assignee: Framatome, Courbevoie, France

[21] Appl. No.: 613,183

[22] Filed: Mar. 8, 1996

[30] Foreign Application Priority Data

Mar. 8, 1995 [FR] France ..................... 95 02720

[51] Int. Cl.$^6$ ..................................... C25D 5/02
[52] U.S. Cl. .................. 205/115; 205/131; 205/255
[58] Field of Search ............................ 205/115, 131, 205/255

[56] References Cited

U.S. PATENT DOCUMENTS

| 4,624,750 | 11/1986 | Malagola et al. | 205/131 |
| 4,696,723 | 9/1987 | Bosquet et al. | 205/115 |
| 4,789,827 | 12/1988 | Bergander | 324/220 |
| 5,516,415 | 5/1996 | Palumbo et al. | 205/115 |

*Primary Examiner*—Kathryn L. Gorgos
*Assistant Examiner*—Kishor Mayekar
*Attorney, Agent, or Firm*—Pollock, Vande Sande & Priddy

[57] ABSTRACT

A thick non-magnetic metal plating (18) constituting a sleeve on the surface of the tube (12) is produced by electroplating a region to be repaired. The plating has a thickness greater than 0.5 mm, and preferably close to 1 mm, and by itself can ensure the mechanical integrity of the tube in service. Preferably, the thick non-magnetic plating is made of a nickel-boron alloy with less than 5% by weight of boron.

9 Claims, 4 Drawing Sheets

METHOD OF REPAIRING A TUBE, SUCH AS A STEAM-GENERATOR TUBE, BY ELECTROPLATING LINING

FIELD OF THE INVENTION

The invention relates to a method of repairing a tube by electroplating lining, such as a steam-generator tube crimped in a tube plate.

BACKGROUND OF THE INVENTION

Heat exchangers such as steam generators and, in particular pressurized-water nuclear reactor steam generators, generally comprise a bundle of very long small-diameter tubes constituting the exchange surface, allowing the feed water of the steam generator to be heated and vaporized.

In a nuclear power station, the reactor of which is cooled and moderated by pressurized water, the heat released by the nuclear reaction is extracted from the core by the primary coolant and transferred in the steam generator to the feedwater which, after vaporization, drives the turboalternator sets of the power station. This feedwater is sent in liquid form into the steam generator, after passing through the condenser.

The exchange surface of a steam generator of a pressurized-water nuclear reactor consists of a large number of tubes (for example, 3400 tubes for each of the three steam generators of a 900 MW.e power station), inside which tubes the primary coolant flows. The feedwater comes into contact with the external surface of the tubes.

The tubes have an internal diameter of approximately 20 mm and are fixed at each of their ends in bores passing through a tube plate having a thickness of the order of 550 mm.

The connection between the tube and the tube plate is provided by expansion of the tube in a corresponding penetrating bore in the plate and by a weld at its lower end.

In addition, the tubes are held transversely by spacer plates which are drilled with holes for passage of the tubes and are distributed along the length of the steam-generator tubes so that any two spacer plates are separated by a distance of approximately one meter.

The tubes of the bundle of a steam generator constitute not only the surface for heat exchange between the primary coolant and the feedwater but also a wall for confining the primary coolant performing an extremely important role as regards the safety of operation of the nuclear plant.

In the case of a power station comprising a pressurized-water reactor having a power of 900 MW.e, the primary coolant is at a pressure close to 155 bar and at a temperature of 300° C., and the feedwater is at a pressure of 56 bar and at a temperature of 271° C.

As a result of the pressure difference existing between the primary coolant and the feedwater, damage of a tube of the generator bundle may give rise to leakage of primary coolant into the feedwater. The primary coolant is laden with substances in solution or in suspension which are radioactive and consequently even a very slight leak in a tube of the steam-generator bundle leads to contamination of the feedwater and of the power station components in which this feedwater circulates. Such a defective operating regime is not acceptable insofar as the feedwater circulates outside the safety buildings of the nuclear reactor in the turbine set and in all the equipment and auxiliary circuits which are associated with this set.

The tubes of the bundle of a steam generator are designed and sized so that they can withstand without damage the various mechanical and thermal loads to which they are subjected in service. The material of which they are made is defined so as to prevent, as far as possible, corrosion of these tubes by the fluids with which the tubes come into contact.

Furthermore, the chemical properties of the primary coolant and of the feedwater are, during the operation of the plant, checked continuously and possibly rectified, so as to reduce the risks of corrosion.

However, it is necessary to ensure at all times that the tube bundle of the steam generator is in a satisfactory state and provides perfect separation of the primary coolant from the feedwater. This checking is carried out by continuous monitoring, in operation, of the level of activity of the feedwater, which makes it possible to detect leaks whose flow rate is very low. During the periods when the nuclear plant is shut down, an examination of the tubes of the bundle is carried out, usually by eddy currents, so as to detect defects whose development could subsequently lead to a leak. This eddy-current examination, which is necessary to ensure satisfactory operation of the steam generator, must, after the nuclear plant has been started up again, be able to be carried out under very good conditions in order to detect any defect which could lead to the appearance of a leak in the steam generator.

Despite the various precautions taken, both during design and manufacture and during the operation of the steam generators, it has turned out that certain materials used for the manufacture of the tubes of the bundle had quite a high sensitivity to stress corrosion, on the primary side. This is the case, in particular, for certain grades of nickel-based alloys containing chromium and iron.

Other types of degradation have also been observed on the feedwater side, such as wear by loose parts or by intergranular corrosion (IGA) or stress corrosion both in the region of the tube plate and of the spacer plates and, exceptionally, in the spanning parts of the tubes.

Stress corrosion develops mainly in the regions where the tube exhibits residual stresses and, in these regions, a crack may form through the thickness of the tube, which is liable finally to result in a leak of the primary coolant into the feedwater.

One region particularly sensitive to this type of corrosion is at the upper face of the tube plate. The reason for this is that the tube, after being inserted into the tube plate and before its lower end is welded, is subjected to a diametral expansion operation called mandrelling or tube expanding and whose purpose is to ensure intimate contact between the external surface of the tube and the surface of the bore drilled in the tube plate.

When the tube has been crimped by mandrelling over the entire thickness of the tube plate, there remains in the wall of the tube a transition zone between the mandrelled part of the tube in contact with the bore of the tube plate and the upper part of the tube which has not been subjected to the diametral expansion. In this transition zone, there are residual stresses in the tube which, in the case where the material is sensitive to stress corrosion, may give rise to intergranular cracking, the growth of which could consequently lead to a leak of primary coolant through the thickness of the tube.

In order to remedy this drawback, methods have been proposed for thermally or mechanically stress-relieving the wall of the tubes of the bundle of a steam generator in the transition zone.

However, it is necessary also to use repair methods which can be employed on steam generators whose tube bundle has already been subjected to degradation.

Certain sleeving methods consist in fixing a sleeve to part of the internal surface of the tube in such a way that the sleeve (or sleeve lining) conceals the crack that has penetrated the wall of the tube or risks penetrating this wall.

The sleeve, whose diameter is less than the internal diameter of the tube, is placed in the desired position inside this tube and subjected to diametral expansion by mandrelling which ensures both the mechanical integrity and the sealing of the fixing of the sleeve. Mandrelling may be carried out over the entire height of the sleeve or just at the upper and lower ends of the sleeve.

The sleeve may also be brazed inside the tube or fixed by a weld bead at each of its ends.

In certain cases, one end, preferably the lower end, of the sleeve is fixed by mandrelling in the tube, and the other end of the sleeve is fixed by welding.

Prior art sleeving methods make it possible effectively to repair tubes having defects resulting from cracks that have grown by stress corrosion and to prevent leaks of primary coolant into the feedwater. However, after a certain operating time with the tubes repaired in this way, it has been observed that the tube bundle had once again a certain leak rate detected by monitoring the radioactivity of the feedwater. Upon examination, it seemed that new defects had developed in the tubes, generally at or near the upper end where the sleeve was fixed in the tube.

The upper end of the lining sleeves, which lies in that part of the tube projecting from the upper face of the tube plate and which is generally fixed by crimping inside the tube, is located precisely in a region where the tube undergoes a certain diametral expansion and where it exhibits a high stress concentration.

The sleeve and the tube exhibit variations in diameter (expansions), in shape and in the nature of the contacts (mechanical, welding or brazing), which make it difficult to carry out the conventional checks using eddy-current probes (integrating probes or rotating probes).

Overall, it is observed that sleeving has two serious drawbacks:

1—in order to ensure bonding between the tube and the sleeve, the corrosion-sensitive tube is deformed and the stresses induced by this deformation lead to a risk of future corrosion in the newly deformed region;

2—the assembly thus formed is very difficult to check because of the complex geometry of the repair.

A method is known, described in FR-A-2,565,323, which makes it possible to protect from stress corrosion a tube such as a steam-generator tube crimped in a tube plate, in particular this tube's transition zone located in the vicinity of the outlet face of the tube plate and corresponding to the region which separates the part of the tube which is expanded inside the tube plate from the part of the tube which is not expanded. This protection method consists in electroplating the internal surface of the tube with a thin metal layer after the tube has been fixed in the tube plate. The electroplating makes it possible to isolate the internal surface of the tube, in particular in the region where the wall of the tube has a high stress concentration, from the exchange fluid such as the pressurized water circulating inside the tube.

Such a method, using nickel plating, has already been widely used. It has two serious drawbacks:

3—a thin layer of nickel protects just the primary side of the tube, but it is too thin to take up the mechanical forces if the tube no longer provides this function because of damage initiated on the external side of the tube;

4—nickel is ferromagnetic, which prevents the tube from being checked using conventional eddy-current methods and requires the addition of a new operation of checking using ultrasound at each shutdown, which results in a high penalty from a cost and a delay standpoint.

SUMMARY OF THE INVENTION

The object of the invention is therefore to provide a method of repairing a tube, such as a steam-generator tube crimped in a tube plate, by lining, consisting in electroplating a surface of the tube with a nickel alloy layer in a region extending over part of the length of the tube, the plated metal layer being non-magnetic and having a thickness greater than 0.5 mm.

Preferably:

the plated metal layer has a thickness sufficient to withstand by itself the forces exerted on the tube in service;

the metal layer has a thickness of between 0.5 and 1.5 mm;

the metal layer has a length of between 100 and 200 mm in the axial direction of the tube;

the plated metal layer is formed by an alloy of nickel and boron, the boron content of which is less than 5% by weight;

the boron content of the nickel alloy is less than 0.5% by weight;

the electroplating is carried out with a pulsed current;

the pulsed current has a frequency of between 50 and 1000 hertz and preferably approximately 100 hertz.

The method which will be described in more detail aims to solve, in a simple manner, all the drawbacks 1, 2, 3 and 4 mentioned hereinabove.

The two aspects, which are closely related and which form the core of the invention, are as follows:

a) in order to overcome the obstacle represented by the ferromagnetic character of nickel with respect to the eddy-current checks, a novel plating material has been chosen which may be formed, for example, of nickel weakly enriched with boron, knowing that Ni-B platings are virtually non-magnetic and therefore allow checking using eddy currents;

b) in order to deposit the equivalent of a sleeve, but without deformation of the tube, which is prejudicial both to corrosion in the deformed region and to the checking of the complex geometry thus formed, only an electroplating method is used in order to deposit a sleeve (for example made of Ni-B) with a large thickness which allows it to take up the mechanical forces and the pressure, even if damage to the tube were to continue via the outside and even if this were to lead to complete cut-off of the tube in the damaged region.

BRIEF DESCRIPTION OF THE DRAWINGS

In order to make the invention clearly understood, a description will now be given, by way of example, of an embodiment of the method according to the invention in the case of a steam-generator tube of a pressurized-water nuclear reactor.

DESCRIPTION OF PREFERRED EMBODIMENT

Figure 1:
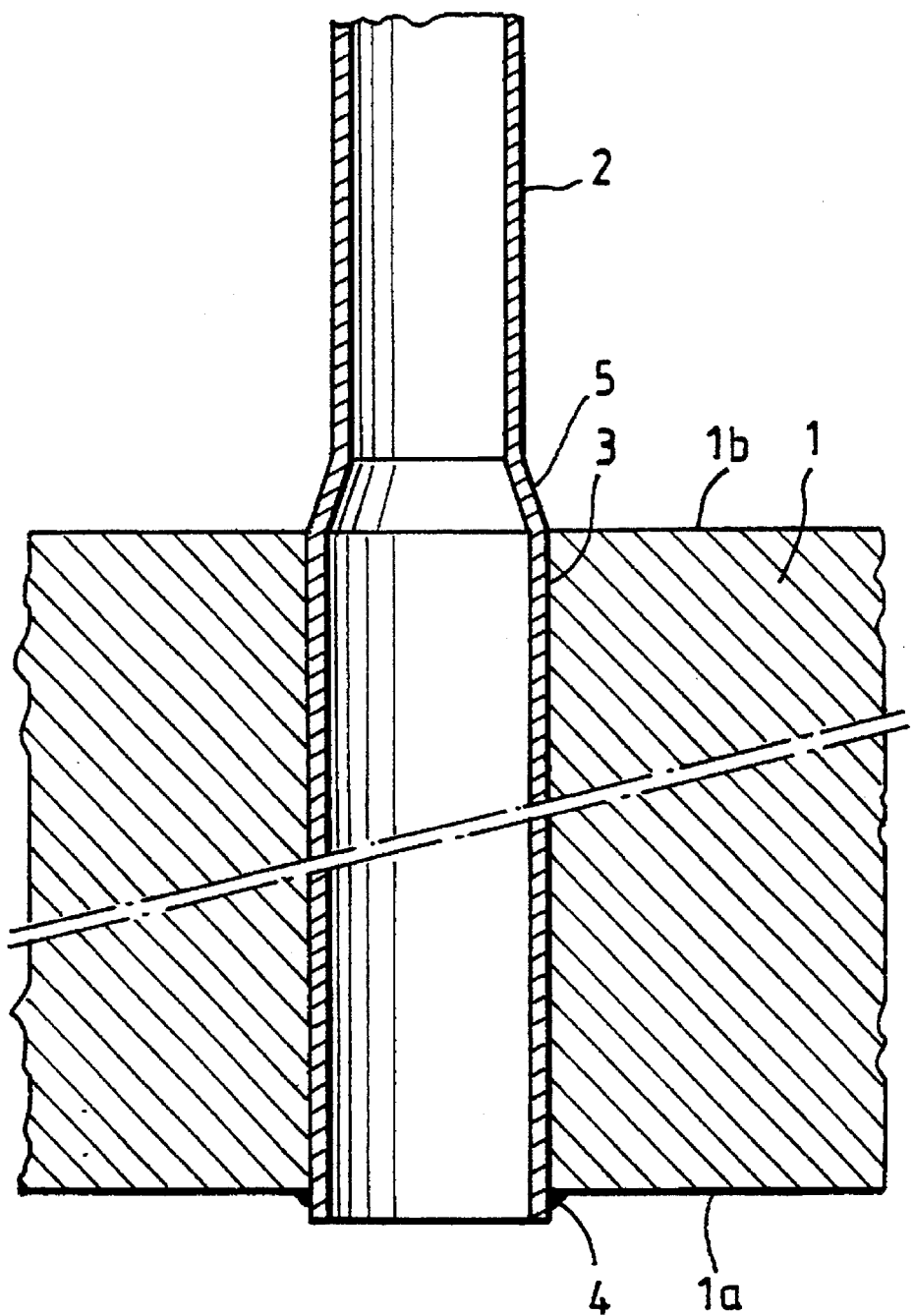
FIG. 1 is a sectional view through an axial plane of symmetry of a steam-generator tube crimped in a tube plate.

FIG. 1 shows the tube plate 1 of a steam generator, having a large thickness, of the order of 550 mm, in which an end of a tube 2 of the steam-generator bundle is fixed inside a bore 3 penetrating the tube plate through its entire thickness between its inlet face 1a and its outlet face 1b. The tube 2 is fixed in the tube plate 1 so that it is virtually flush with the inlet face 1a and projects from the outlet face 1b of the tube plate. The inlet face 1a of the tube plate constitutes one of the walls of the water box of the steam generator, into which water box enters the primary coolant which is made to circulate inside the tubes 2.

The tubes 2 project from the outlet face 1b of the tube plate which delimits the steam-generator upper part in which the tube bundle is arranged.

The feed water of the steam generator enters this upper part and comes into contact with the external surface of the tubes 2.

The tubes 2 of the bundle are fixed at their ends in the penetrating holes 3 in the tube plate 1 by mandrelling the tube inside the bore 3, resulting in diametral expansion and crimping of the tube which is deformed on contact with the surface of the bore 3. The fixing and sealing of the tube 2 are completed by a welded joint 4 at the inlet face 1a of the tube plate.

The tube 2 has, in the vicinity of the outlet face 1b of the tube plate, a transition zone 5 between the lower region of the tube, deformed by diametral expansion, and the upper non-deformed region of the tube. In this zone 5, the wall of the tube 2 exhibits a high stress concentration which promotes stress corrosion of the tube while the steam generator is operating.

Figure 2:
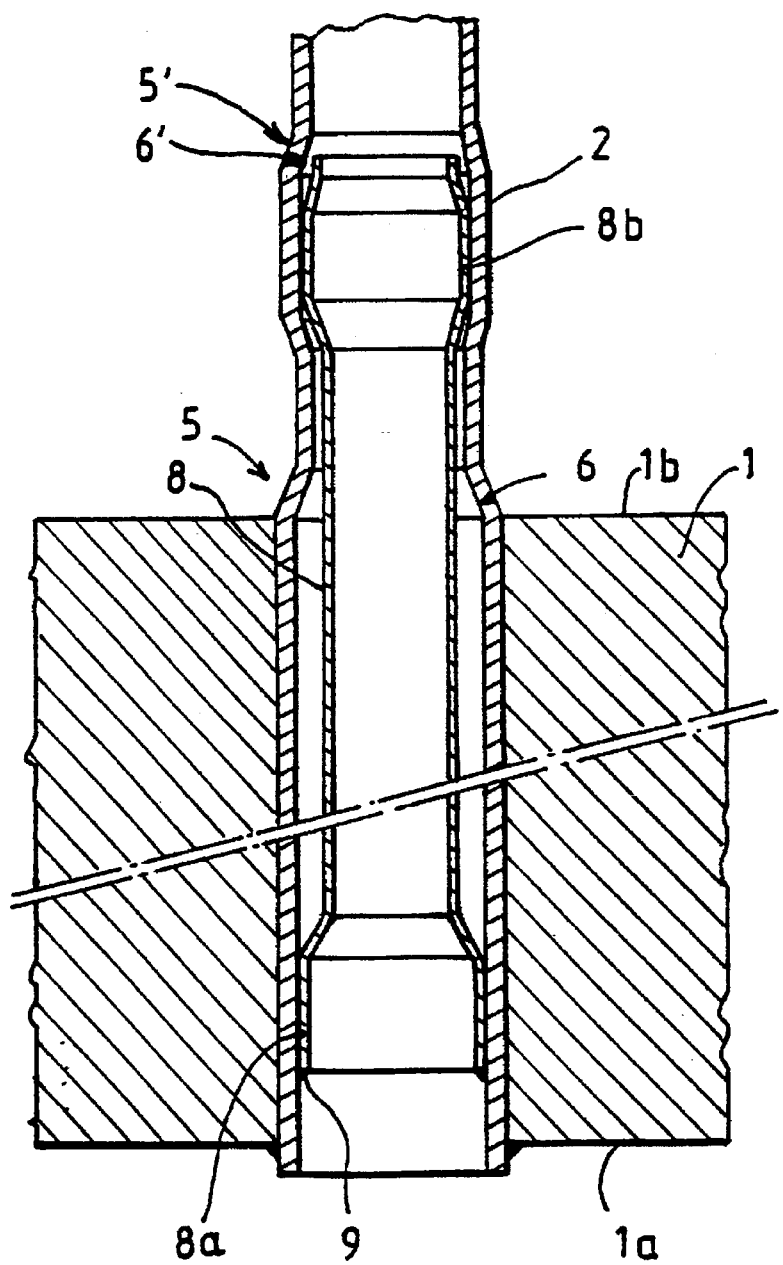
FIG. 2 is a sectional view through an axial plane of a steam-generator tube comprising a sleeve fixed in the tube using a method according to the prior art.

In the case of steam-generator tubes made of an alloy sensitive to this type of corrosion, for example a nickel-based alloy containing chromium and iron, there may be extensive stress corrosion in the transition zone 5 and this may result in the formation of a crack 6 penetrating the wall of the tube 2 in the transition zone 5, as may be seen in FIG. 2.

Growth of the crack 6 may lead to a leak of the primary coolant circulating in the tube 2 to the steam-generator part containing the feed water, located above the plate 1b.

In this case, it is possible to carry out a repair of the tube 2 by lining, as shown in FIG. 2.

A lining sleeve 8 is inserted into the tube 2 via its end flush with the inlet face 1a of the tube plate, so as to cover the region containing the crack 6.

The lining sleeve 8 is subjected to diametral expansion in two end regions 8a and 8b by mandrelling. The sealed fixing of the sleeve 8 is finished off by a weld 9 at its lower end.

The deformation of the tube 2 in the region 8b of the sleeve causes the formation of a new transition zone 5' between a deformed part and a non-deformed part of the tube 2, in which the wall of the tube 2 exhibits a high stress concentration.

When the steam-generator is operating, the tubes, such as the tube 2, which have been lined are liable to exhibit leak-generating cracks 6' in the transition zones, such as the zone 5'.

The presence of penetrating cracks 6' may result in leaks of the primary coolant into the feedwater.

The method of repair according to the invention, which will be described with reference to FIG. 3, prevents the formation of cracks by stress corrosion in the repaired regions of the tube since the latter is not deformed.

Figure 3:
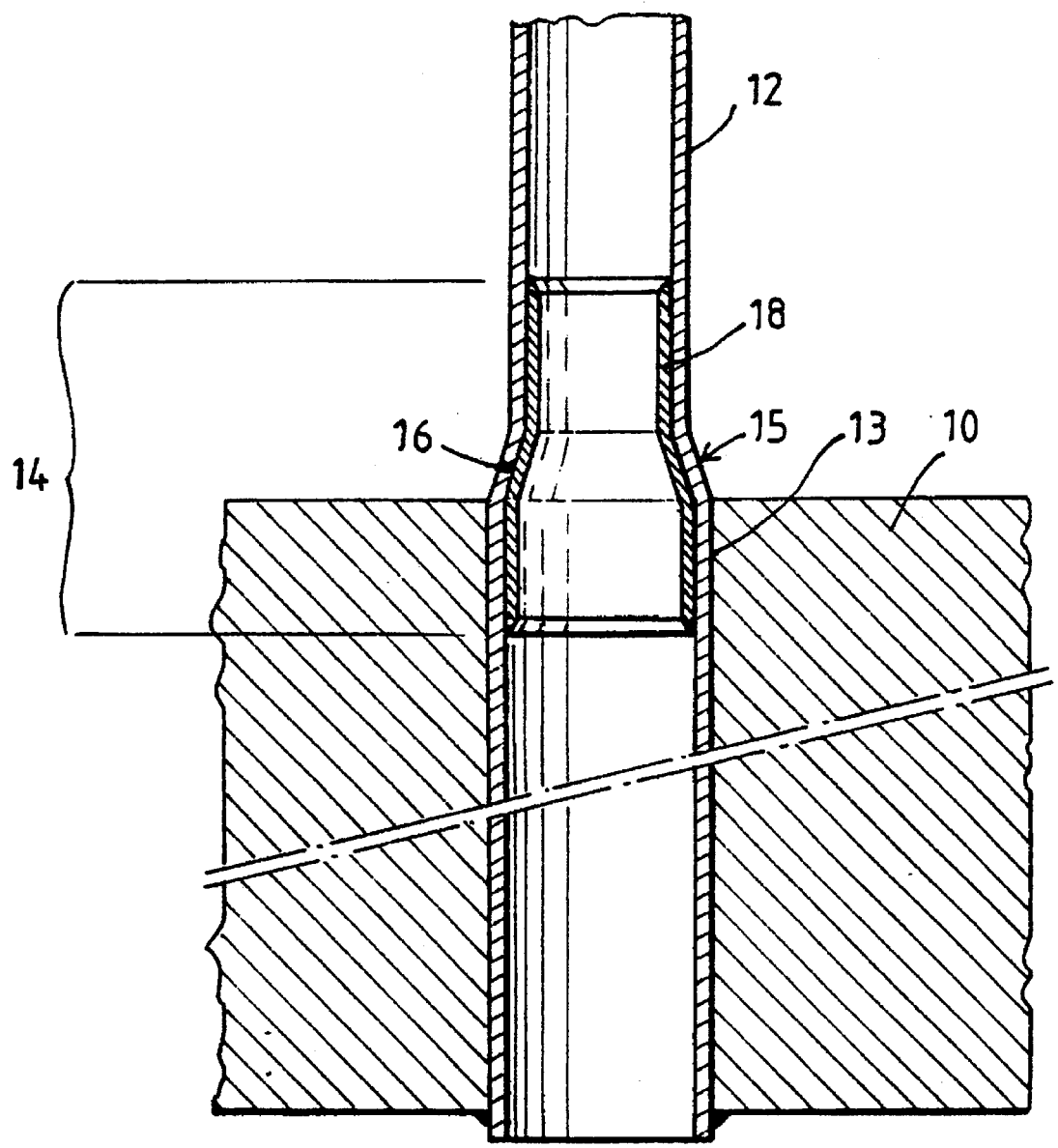
FIG. 3 is a sectional view through an axial plane of a steam-generator tube comprising a sleeving deposited inside the tube using the method according to the invention.

FIG. 3 shows the end of a tube 12 of a steam generator, fixed by crimping and by welding in a penetrating bore 13 in a very thick tube plate 10.

The tube 12 underwent a high degree of stress corrosion in its transition zone 15 and a leak-generating crack 16 was formed in this zone 15.

During a shutdown of the power station in which the steam generator was used, the tube 12 was lined using the method according to the invention.

Firstly, the internal surface of the tube 12, in a region 14, is cleaned and descaled so as to remove all traces of oxide from this surface.

The position and length of the region 14 are defined in terms of the position of the crack 16 and of the transition zone 15 of the tube 12 and in terms of the length of the region of lining over the sound tube, on each side of the damaged region, this length being necessary to ensure good mechanical bonding between the liner 18 and the tube 12.

After cleaning the region 14, a thick electroplating 18 of nickel-boron is produced on the internal surface of the tube in this region.

This electroplating, having a thickness of the order of one millimeter, may be produced by using a known device comprising plugs or seals for closing off the tube in a sealed manner on either side of the region 14, and means for supplying the region so delimited liquid electrolyte, as well as means for bringing the plating current into the region 14.

Such a method of electroplating the surface of a tube, denoted by the abbreviation NEP (Nickel Electro-Plating) is described in FR-A-2,565,323 and EP-A-0,167,513.

Compared to the patents mentioned hereinabove, an addition of boron is preferably used, by adding to the nickel sulfamate solution 10 to 40 g/liter of dimethylamineborane $(CH_3)_2NHBH_3$.

Basic solutions other than nickel sulfamate can be used as the plating solution, such as soluble nickel carbonate, nickel chloride and nickel sulfate. Additions of sodium hydroxide enable the pH of the solution to be fixed between 4 and 6.

To accelerate the rate of plating, a preferred solution consists in using currents pulsed at frequencies of 50 to 1000 hertz with a cycle of 10 milliseconds which may comprise, for 100 hertz, 2 cathodic active milliseconds at 80 amps/$dm^2$, an optional anodic time of 0.1 milliseconds at −20 amps/$dm^2$ and a resting time of 7.9 milliseconds.

The nickel-boron electroplating 18 is sufficiently ductile and adherent to withstand the in-service deformations of the tube and the difference in pressure between the inside and the outside of the tube.

In addition, the electroplated nickel-boron layer 18 is not sensitive to stress corrosion under the conditions of use of the steam generator.

The plating 18 therefore prevents the appearance of new cracks, such as the crack 6' shown in FIG. 2, while the steam generator is operating, after lining the tube 12 using the method according to the invention.

In this manner, effective protection of the tube in the transition zone is obtained.

Figure 4:
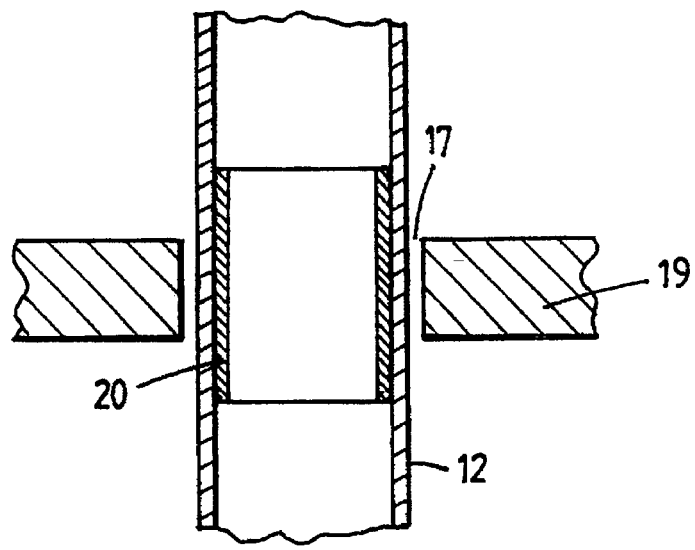
FIG. 4 is an axial sectional view of part of a steam-generator tube, engaged in an opening in a spacer plate in which a repair is carried out using the method according to the invention.

FIG. 4 shows a steam-generator tube 12 in a region penetrating an opening in a spacer plate 19 of the steam generator with a clearance 17 allowing the tube 12 to be engaged without risk of damaging its outer surface. When the steam generator is in service, the clearance 17 constitutes a crevice favoring corrosion of the wall of the tube. It therefore may prove to be necessary to repair the tube 12 in the region where it penetrates the spacer plate 19 or to plate it preventively with a protective sleeve.

A repair or protective sleeve 20, having a thickness of approximately one millimeter of nickel-boron, may be produced by electroplating the inner surface of the tube 12 in the region of penetration of the spacer plate 19.

Figure 5:
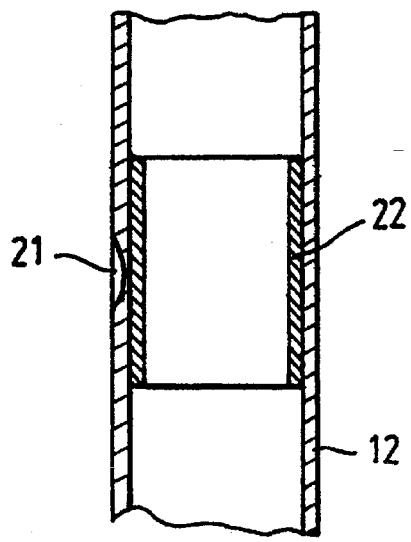
FIG. 5 is an axial sectional view of a damaged spanning part of a steam-generator tube, in which a repair is carried out using the method according to the invention.

FIG. 5 shows a spanning part of a steam-generator tube 12, for example spanning between two successive spacer plates.

The tube 12 is liable to corrode in service and to have a damaged region 21 on its outer surface.

During a shutdown of the reactor, a sleeve 22 is electroplated on the inner surface of the tube 12 in the damaged region. The sleeve 22 is preferably made of nickel-boron and has a thickness of the order of one millimeter.

Instead of an electroplating of nickel-boron, depending on the material of the tube to be lined and on its conditions of use, it is possible to plate with a non-magnetic plating made of another metal or, more generally, a plating of an appropriate metallic chemical compound.

The thickness of the plating may differ from one millimeter, depending on the nature of the plating, on the size of the tube and on the geometrical characteristics of the lining sleeve. However, the plating must be at least 0.5 mm thick so as to be able to ensure sufficient mechanical integrity by itself. In general, the plating may have a thickness of between 0.5 and 1.5 mm.

The region in which the tube is cleaned before being plated may extend towards-the bottom of the tube, beyond the fixing region of the sleeve and the corresponding lower transition zone.

The plating may be carried out in a region extending inside the tube plate so as to ensure enhanced protection of the tube against corrosion.

The plating may also be carried out in a region of the tube engaged inside a spacer plate of a steam generator or in a spanning region along the length of the tube. In all cases, the plated region will preferably have a length in the axial direction of the tube of between 100 and 200 mm.

The invention applies not only to steam-generator tubes of pressurized-water nuclear reactors but also to tubes located in other parts of the nuclear power station coming into contact with the primary coolant. In particular, the invention may be applied advantageously to nozzles penetrating the casing of the pressurizer of a pressurized-water nuclear reactor.

More generally, the invention may be applied in all cases where tubes are subjected to corrosion and have to be checked by eddy-current probes.

I claim:

1. Method of repairing a steam-generator tube crimped in a tube plate lining, to repair a wall of said tube having cracks resulting from stress corrosion and to prevent leaks of primary cooling through said wall of the tube, said method consisting of electroplating an inner surface of the tube with a metal layer in a region to be repaired, wherein the plated metal layer has a thickness greater than 0.5 mm and is a non-magnetic nickel alloy to allow continuous monitoring of leaks by eddy currents.

2. Method according to claim 1, wherein the plated metal layer has a thickness sufficient to withstand by itself forces exerted on the tube in service.

3. Method according to claim 1 or 2, wherein the metal layer has a thickness smaller than 1.5 mm.

4. Method according to claim 1 or 2, wherein the metal layer has a length of between 100 and 200 mm in an axial direction of the tube.

5. Method according to claim 1 or 2, wherein the nickel alloy is a nickel-boron alloy containing up to 5% by weight of boron.

6. Method according to claim 5, wherein the boron content of the nickel alloy is less than 0.5% by weight.

7. Method according to claim 5, comprising electroplating the surface of the tube by using an electrolyte containing a nickel sulfamate solution and 10 to 40 g/liter of dimethylamineborane $(CH_3)_2NHBH_3$.

8. Method according to claim 1, wherein the electroplating is carried out with a pulsed current.

9. Method according to claim 8, wherein the pulsed current has a frequency of between 50 and 1000 hertz.

* * * * *